May 29, 1934.  W. HAHNEMANN  1,960,439
APPARATUS FOR DISTINGUISHING THE FAIRWAY FOR SHIPS AND AIRCRAFT
Filed Jan. 6, 1930  2 Sheets-Sheet 1

Inventor:
Walter Hahnemann
by Paul D. Schilling
Attorney

May 29, 1934.   W. HAHNEMANN   1,960,439
APPARATUS FOR DISTINGUISHING THE FAIRWAY FOR SHIPS AND AIRCRAFT
Filed Jan. 6, 1930   2 Sheets-Sheet 2

Inventor:
Walter Hahnemann
by
Attorney

Patented May 29, 1934

1,960,439

UNITED STATES PATENT OFFICE 1,960,439

APPARATUS FOR DISTINGUISHING THE FAIRWAY FOR SHIPS AND AIRCRAFT

Walter Hahnemann, Berlin-Marienfelde, Germany, assignor to C. Lorenz Aktiengesellschaft, Berlin-Tempelhof, Germany Application January 6, 1930, Serial No. 418,742
In Germany January 10, 1929

6 Claims. (Cl. 250—11)

I have filed applications in Germany on January 10, 1929; Great Britain May 4, 1929; France April 23, 1929; the Netherlands, April 26, 1929; Italy April 29, 1929; and Austria April 23, 1929.

In order to determine the course of vessels under way, it has been proposed to install wireless transmitters at the points to be steered to and to determine their direction by a directional aerial system installed on the vessel. This method can be carried out for a small number of directional points, but it is not possible to create a system with which to distinguish, say, an entrance to a harbor by a large number of marking points, similarly to the present arrangements of light-houses and light-buoys. If ordinary wireless transmitters were arranged in the same number as the light-houses of to-day, then on one hand, difficulties would arise in that the transmitters would have to work with different wave-lengths, but the wave range available would be too small, on the other hand, on working with equal wave-lengths, differentiation between the individual marking points would no longer be possible.

An embodiment of the invention is illustrated in the accompanying drawings wherein.

An extensive system of marking points can, however, be erected, if, according to the present invention, there are used ultra-short waves, that is to say those with a wave-length less than ten metres which have a definite local range so that the propagation zones of the various transmitters do not overlap. For this purpose, only waves are suitable the length of which is less than ten metres. By experiment it has been repeatedly shown that for waves of this length the so-called Heaviside layer does not exist, since the radiated waves do not meet the earth's surface again, but are radiated freely into space. This fact is made use of in the present invention by the arrangement of the transmitters in such a manner that their range is exactly determined. The range of a transmitter working with ultra-short waves ($\lambda<10$ metres) can be determined if it is assumed that waves of this kind are propagated exactly like rays of light. The waves of such a transmitter, which propagates rays in a straight line can be received only by those stations which lie within a cone which is formed by tangents that are placed from the transmitter to the surface of the earth.

Figure 1:
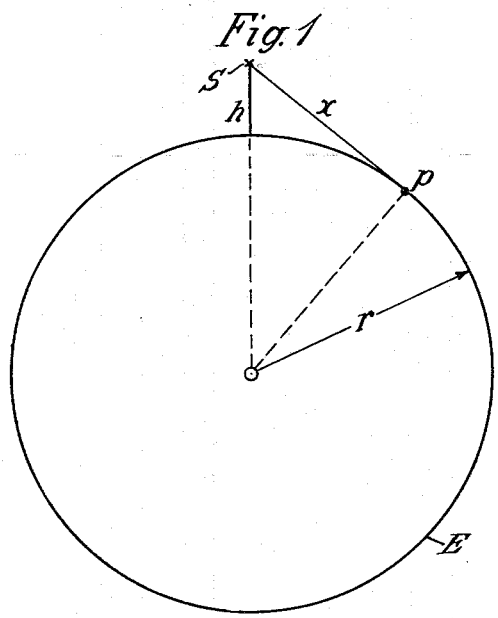
Figure 1 shows diagrammatically the calculation of the range of a transmitter of ultra short waves.

In Fig. 1 of the accompanying drawings, a diagrammatic illustration is given in order to explain this law.

In Figure 1 the earth is indicated by E, on which is located a mast the height of which is indicated by $h$. A transmitter for ultra-short waves is located on the mast. The longest ray falling on the earth's surface is formed by the tangent $x$ from the transmitter to the tangent point $p$ on the surface of the earth. All the space rays do not meet the earth since they are not reflected by the Heaviside layer. The distance of the point $p$ from the transmitter is given by $$x=\sqrt{2rh},$$

neglecting the curvature of the earth, if the radius of the earth is denoted by $r$. If the distance $x$, that is, the range of the transmitter, is given, then the necessary height H of the mast can be calculated, since the longer the mast, the greater must the range be. In the above equation the influence of the curvature of the earth may be neglected, since, as can be seen from the following numerical example, the necessary ranges of the transmitters of and for themselves are not great. With a required range of twenty kilometres, a mast height of about 33 metres results when the given formula is solved with respect to $$H:h=\frac{x^2}{2r}.$$

The advantage of ultra-short waves is that the transmitters need only be of very small power, of the order of magnitude of a few watts, in relation to the directional transmitters of large power used hitherto.

Figure 5:
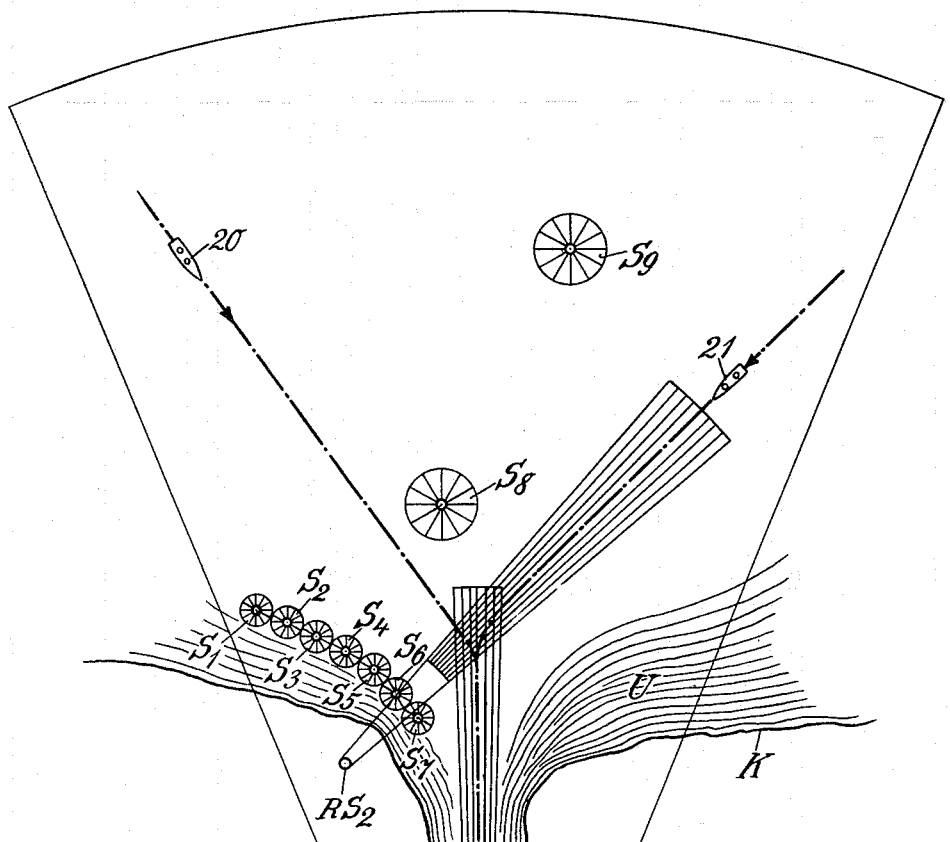
Figure 5 shows the entrance of a harbor equipped according to this invention with transmitting stations.

A further advantage is, that such waves, by the use of directional aerial systems, such as, say reflector arrangements, can be concentrated on quite definite spaces. If say, the harbor entrance shown in Figure 5 is to be safeguarded by marking points for the ship traffic by the arrangement according to the invention, then there is no purpose in arranging on land a main transmitting station which radiates uniformly, on all sides, that is over the land. This would mean an unnecessary waste of energy, and it is quite enough to radiate over the sea region. For this purpose, a reflector is proposed as is diagrammatically shown in Figure 2. The reflector is a parabola which is revolved about the point P.

At the focus of the parabola an excitation aerial A is arranged which is directly coupled to the transmitter. The reflector 1 proper is mounted on a mast 3, which is erected on land at a suitable site. By a suitable construction of the mirror or positioning of the same in space on the mast, the radiated waves can be limited to quite a definite portion of the region. Further reference to this is made hereinafter in connection with Figure 4.

Figure 3:
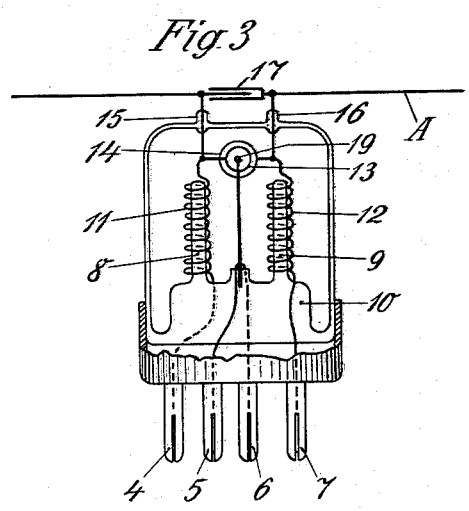
Figure 3 shows the transmitting tube employed in Figure 2.

As regards the transmitting tube and its connection the following may be said with reference to Figure 3: The arrangement illustrated therein shows the advantage that all parts are conveniently united in the tube and there are merely plug pins for the leads supplying the current, while the antenna too is connected by means of plug pins.

When producing ultra-short waves it is necessary to arrange within the tube choke coils as closely as possible to the electrodes, which will take care that the high frequency oscillations will not enter the leads for the supply of current. The plug pins for the leads for the supply of current are designated by 4, 5, 6, 7. The choke coils 11 and 12 are wound on two glass supports 8 and 9 in the anode and grid circuit, which supports are integral with the squash 10. The anode 14 is constructed in the customary manner and it is at the same time held by the support 8. Within the said anode is arranged the grid 13. There are no choke coils within the heating circuit in the example illustrated, while in practice these are mostly used. As closely as possible to the grid and the anode leading out wires 15 and 16 are arranged, through which the leads to the excitation antenna A are passed. For the purpose of tuning the excitation aerial a capacity 17 is arranged between 15 and 16. The supply of current, that is to say the A and B batteries are connected to leads which are passed down the mast suitably in the form of a cable 18. At the foot of the mast are arranged the necessary batteries.

Figure 4:
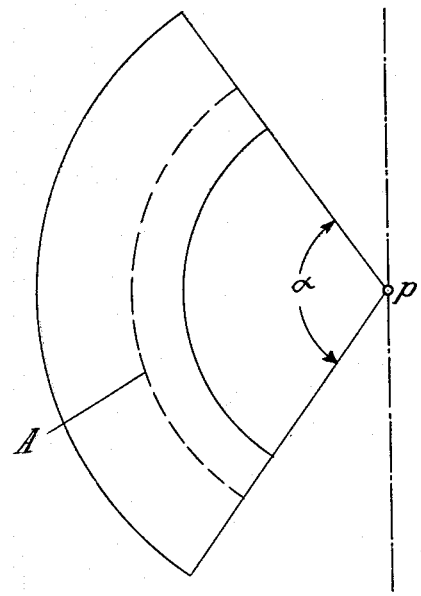
Figure 4 illustrates the restricted area and distance covered by the waves of the directed transmitting arrangement.
Figure 4:
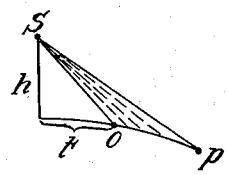

Figure 4 illustrates the conditions prevailing when the mirror or reflector together with the tube is arranged in such a manner, that the waves emanated, are restricted to a definite area only. The longest ray emanating from the transmitter goes to the point $p$ while the shortest ray reaches the point $o$.

The region between the point at the foot of the mast and the point $o$ is not touched by any transmitted wave and is to be designated as a dead zone $t$. Since the propagation relationships with ultra-short waves exactly correspond to those of light rays, it can easily be seen that operations according to Figure 4 can be effected without technical difficulties.

Figure 2:
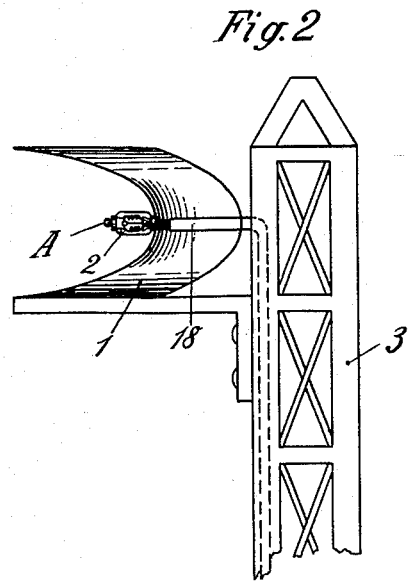
Figure 2 shows a transmitter of ultra short waves with its reflector mounted on a mast.

A constructional example of the arrangement according to the invention is given in Figure 5 for a harbor entrance. The course directing points are fixed by wireless transmitters of definite ranges, while on the vessel there are located receiving arrangements for ascertaining the direction of the transmitters. The radio receiver located on the vessel should, of course, be suitable for receiving the signals transmitted from the various transmitting stations safeguarding the harbor entrance. As an example, reference is made to the receiver disclosed in Patent No. 1,303,729 issued May 13, 1919. A ship coming from the sea first steers to the harbor independently of the shallows near the coast. The wave radiated by the main transmitter HS serves as direction indicator. The radiation area of the individual transmitters is shown in the illustration by segments of circles where arrangements according to Figure 2 are used. If, on the contrary, ordinary transmitters for ultra-short waves are installed, then a circular surface forms the radiation area. If the ship comes near the coast, then, according to its position, it comes into the region of the one or the other transmitter. The ship traveling on the course 20, on approaching too closely to the shallow U shown on the map, is warned against this approach by small transmitters $S_1$ to $S_7$. These warning transmitters may work on the same wave-length as the other directional transmitters, but must then be distinguished by certain signals which are transmitted.

It is also conceivable to work with different wave lengths, and to install signal apparatus on board ship which are released by the warning signals impinging thereon. In the example 20 the ship comes between the coast-shallow and a further shallow located seaward by steering in such a manner that it receives signals neither from the transmitter $S_5$ nor from the transmitter $S_8$ which is installed on the shallow located to seaward. The course is retained until the ship comes within the range of the directional transmitter $RS_1$. In order to guarantee a safe entry into the harbor, the ship steers towards the beam of this directional transmitter. In the example of the ship course 21, it is assumed two directional transmitters are used, by the aid of which the ship is guided into the harbor. First, the transmitter $RS_2$ is located. Preferably, in this case, a transmitter is concerned, the radiation arrangements of which correspond to Figure 4, a dead zone $t$ being located near the coast. As soon as the ship comes from its directed course to the transmitter $RS_2$ into the radiation range of $RS_1$, it puts on rudder and makes a course for the inner harbor.

On board the vessels there are located directional aerials preferably in the form of small parabolic reflectors. For the range of ultra-short waves both transmitting and receiving reflectors are extremely small. The intended radiation arrangements of the waves can be obtained without difficulty, if the distance of the excitation aerial from the parabola is at least 2.5 times the wave length employed. The reflector itself remains of reasonable size even on using a two metres wave.

Figure 6:
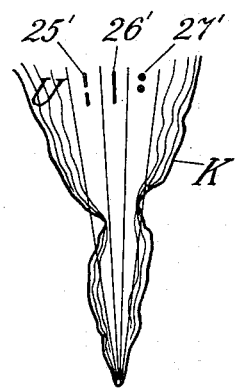
Figure 6 shows the safeguarding of the inner portion of the harbor entrance.
Figure 7:
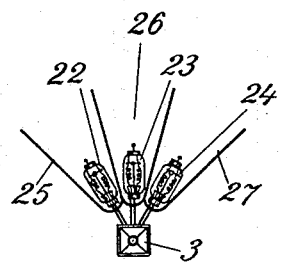
Figure 7 shows the arrangement of the transmitters with their reflectors employed in the safeguarding scheme according to Figure 6.

For distinguishing a certain fairway, there may be used also the arrangement shown in Figure 6, wherein three beams of rays are used. The central one of these beams is characteristic of the navigable water and is modulated, by way of example, by a continuous dash (–). As soon as the vessel deviates from its course it comes within one of the other two beam areas, the waves of which are modulated by dots (. . .) and dashes (_ _ _). Such a distribution of the waves can easily be achieved by the aid of a reflector arrangement according to Figure 7. There are arranged in this instance three reflectors 25, 26 and 27 adjacent each other, in which a transmitting tube 22, 23, 24 each is provided. The whole device is mounted on a mast which is denoted by 3. The construction of the transmitting tube is the same as that shown in Figure 3. The modulation of the emanated oscillations is obtained in known manner in the simplest way in the form of a modulation of an anode tension according to Heising, which will render it possible to provide at the foot of the mast a modulation device and in consequence allows to keep the arrangement on the mast as small as possible.

It is also conceivable to arrange small transmitters on the vessel, by means of which vessels may be mutually warned in a manner corresponding to the fog signals in use to-day.

The above-described arrangement has the advantage over previous arrangements using light signals, in that it can be used with success even in the case of fog, since the wireless waves are scarcely influenced by the latter. It is obvious that a similar arrangement can be adapted at any time for air traffic, by arranging transmitters of ultra-short waves along the line of flight.

I claim:

1. The method of distinguishing fairways and points of navigation for ships on a navigable channel, which comprises transmitting wireless waves from a point of danger, and so limiting the path of said waves to be intercepted by a ship that the interceptable area has a limit at a predetermined distance from the point of danger and such limit defines the adjacent side of said channel.

2. The method according to claim 1 characterized by transmitting from a point in line with said navigable channel wireless waves directed along said channel and intersecting the path of the first-mentioned transmitted wireless waves so that said intersecting paths define contiguous navigable portions along said channel, and limiting the breadth of said paths to the area within which said channel is navigable.

3. The method of distinguishing fairways and points of navigation for ships, which comprises transmitting from points of danger on each side of a navigable channel wireless waves for such predetermined distances toward the middle of said channel that said navigable channel is defined as an intervening path in which there are no wireless waves present so transmitted.

4. The method according to claim 3 wherein a continuation of said navigable channel is defined by signal modulated wireless waves transmitted directionally therealong.

5. The method of assisting navigation with ultra short wave transmitters, which comprises transmitting from points of danger warning signals within a restricted area adjacent thereto, and transmitting safety signals along said channel from points in line therewith.

6. The method of assisting navigation with ultra short wave wireless transmitters, which comprises transmitting from points in line with contiguous portions of a navigable channel safety wireless signals distinguishable one from another according to said navigable portion, directing such signals along the respective contiguous channel portions so that the path of each signal so directed intersects the paths of signals directed along adjacent channel portions, thereby defining the continuity of the said navigable channel, and restricting the breadth of said paths to the area within which said channel is navigable.

WALTER HAHNEMANN.